March 4, 1969
L. R. ULLERY, JR., ET AL
3,431,383
EDGE GUIDANCE OF AN UNSEAMED TUBE IN THE
CONTINUOUS WELDING OF THE TUBE
Filed June 7, 1963
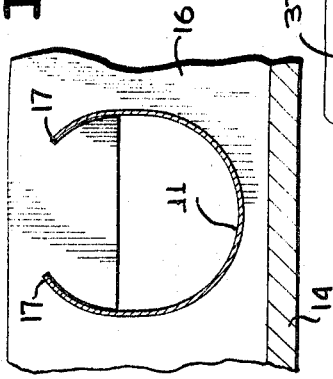
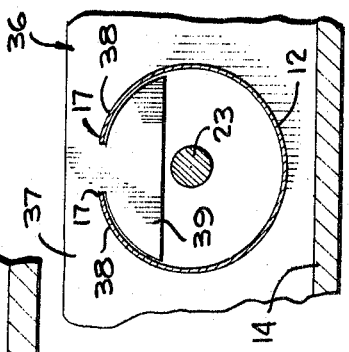
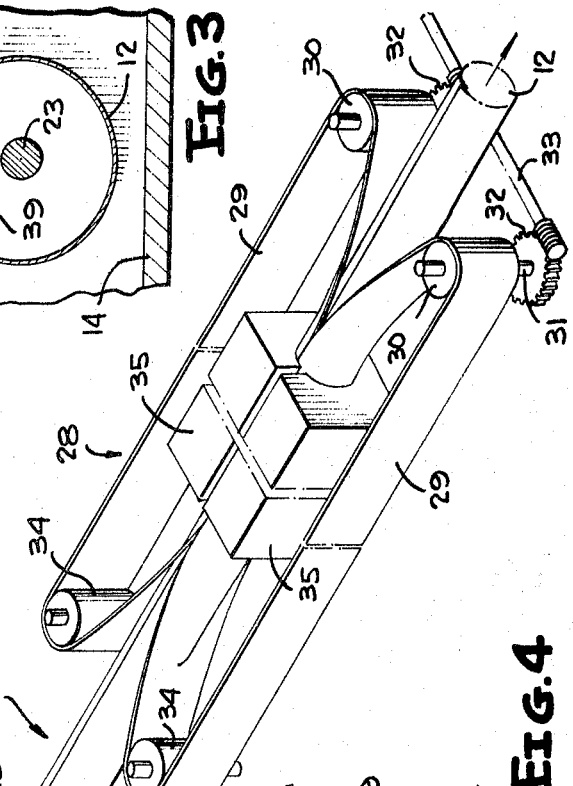
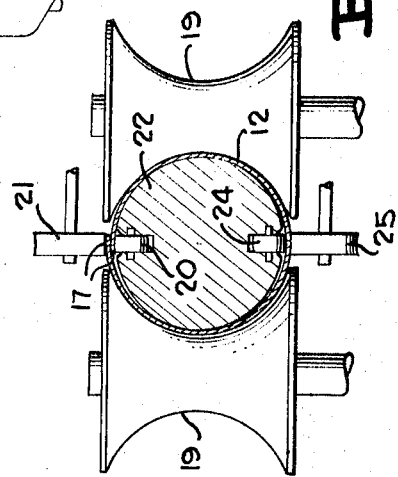
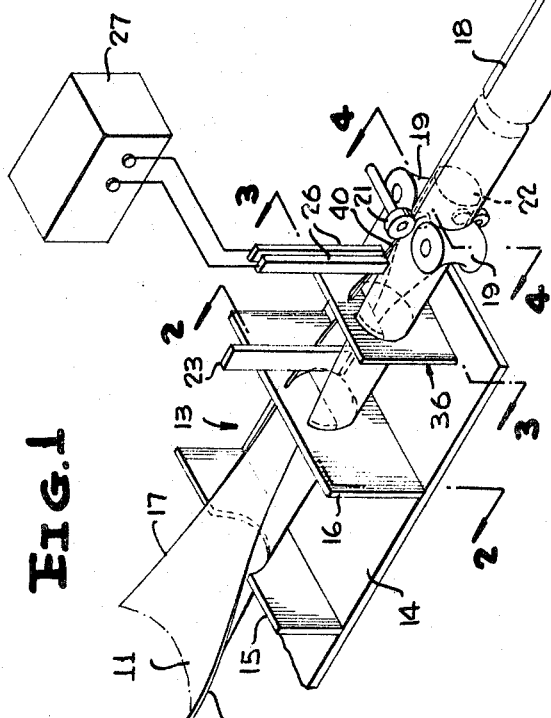
INVENTORS
LEE R. ULLERY, JR.
& STEVE F. WRONSKI
BY
Mason, Porter, Diller & Stewart
ATTORNEYS United States Patent Office 3,431,383
Patented Mar. 4, 1969

3,431,383
EDGE GUIDANCE OF AN UNSEAMED TUBE IN THE CONTINUOUS WELDING OF THE TUBE
Lee R. Ullery, Jr., Simsbury, Conn., and Steve F. Wronski, Chicago, Ill., assignors to Continental Can Company, Inc., New York, N.Y., a corporation of New York
Filed June 7, 1963, Ser. No. 286,417
U.S. Cl. 219—59                                   4 Claims
Int. Cl. B23k 31/06

This invention relates in general to new and useful improvements in apparatus for the high speed forming of thin walled tubing, and more particularly relates to an edge guidance apparatus for effectively controlling the position of unseamed edges of a tube immediately prior to a seam welding operation.

This invention generally relates to the manufacture of this walled tubing but finds special application in the art of forming can bodies. Until recently, cans, which are made by the millions, were separately manufactured. For each can body a separate blank is normally formed, shaped, seamed and then the seam is normally soldered. However, a tremendous stride forward in the manufacture of can bodies and other thin walled tubular members has been recently accomplished with the employment of welding techniques in the forming of a continuous tube.

In the employment of recently developed welding techniques for can body manufacture, for all practical purposes, a continuous strip of can body material is transported at a very high speed from a source, for example a coil of strip material. Depending upon the type of seam desired, the width of the strip is either slightly in excess of the circumference of the desired can body or corresponds substantially to the circumference of the can body. In the course of the high speed longitudinal advance of the strip, the strip is passed transversely towards a closed configuration with the opposite edge portions of the strip being finally brought into contacting relation for welding together. The welding technique has proved successful with existing types of can body forming metals including black plate, tin plate and various aluminum alloys.

In the course of joining together the edge portions of the strip, the edge portions are heated by the application of radio frequency electrical energy to the edge portions while they are still spaced apart. Thereafter, the heated edge portions are brought into contacting relation and forged together to effect a longitudinal seam in a continuously formed tube. If the seam is to be of a lap joint type, the forging is only sufficient to press together contacting surfaces of the edge portions to effect the weld. However, if the width of the strip corresponds to the circumference of the can body, then there is a simultaneous forging of the lapped edge portions to cause a circumferential flowing of the lap material whereby the resultant seam is of a single thickness.

The continuous tube, immediately after the seam welding operation, is separated into can body lengths in any desired manner. It has been found, however, that if the strip is scored in advance of the forming thereof into a tube, the separation of the welded tube into can body lengths is greatly facilitated.

A principal advantage of the welding technique in the can making art is the fact that the continuously extending strip may be advanced longitudinally and welded at an extremely high speed. Thus, can bodies may be presently manufactured at rates which are two to three times faster than those which are possible wherein each can body is formed from a separate blank.

However, the high speed movement of the strip in the forming of the tube has presented many associated mechanical problems. A principal one of these problems is that the high speed movement of the strip induces vibrations into and effects erratic behavior of the rapidly moving strip edge portions. In addition to this problem of controlling the movement of the strip edge portions, there is the problem that upon heating, the strip edge portions have a radially varying tensile strength in accordance with the temperature existing within the particular part of the strip edge portion, the temperature rapidly changing as the strip edge portions are advanced.

It is to be appreciated that for the effective forge welding together of edge portions of a rapidly moving strip, the edge portions must be accurately positioned. However, the above enumerated problems make the desired accurate positioning of the strip edge portions very difficult. Further, the difficulty in accurately positioning the strip edge portions greatly increases as the speed of the advance of the strip is increased. On the other hand, in order to obtain the full advantage of a welding technique in the manufacture of can bodies, it is necessary that the welding take place at a very high rate.

The problems encountered in the guidance of edge portions of a strip during a high speed welding operation are as follows:

(1) There is a definite tendency of the edge portions to rotate about the axis of the formed tube with the result that there is (a) a tendency for the edge portions to move from beneath the forge rolls used in forging together the contacting edge portions and (b) when electrodes are utilized for the application of high frequency electrical energy, this tendency to rotate may result in a single edge portion engaging both electrodes and a shorting across the electrodes, thus providing a dead short with possible very destructive results in the electrical energy generator circuit.

(2) The heating of the edge portions of the strip is such that immediately prior to the contacting of the edge portions, the metal of the edge portions approaches a near molten state with the result that there is a very low tensile strength in the strip edge portions. This low tensile strength of the strip edge portions at the time the strip edge portions are brought into contacting relation presents a problem of material build up. The material build up may result from a slight flowing of the metal or the rippling of the metal due to the improper support thereof. Such material build up will result in the jamming of the machine due to the fact that the forge rolls, of necessity, must be set for a predetermined metal thickness in order to produce the required forging action.

In view of the foregoing, it is a primary object of this invention to provide adequate edge guidance means for strip edge portions immediately prior to the bringing together of the strip edge portions into contacting relation.

Another object of this invention is to provide means for eliminating the rotation of a strip to be welded into a tube during the movement of the tube through a seam welding apparatus.

Yet another object of this invention is to provide for the adequate support of heated strip edge portions in the forming of a seam of a continuously welded tube whereby uniform entry of the heated strip edge portions into forging relation with forging rolls is effected.

Another object of this invention is to provide means for uniformly positioning edge portions of a strip relative to means for supplying electrical heating energy during the continuous welding of a tube whereby there is a more uniform and continuous supplying of the necessary heating energy to the strip edge portions.

A further object of this invention is to provide for the accurate guidance of strip edge portions during a tube welding operation to avoid an undesired shorting across electrodes which would result in damage to the means supplying electrical energy to the edge portions.

A still further object of this invention is to provide means for effecting the tensioning of the heated strip edge portions during a tube welding operation whereby the heated strip edge portions are supported even though the tensile strength thereof is greatly reduced due to heating, whereby the heated strip edge portions maintain a uniform shape and each strip edge portion constantly presents only a single thickness for contacting relation with opposite strip edge portion.

A still further object of this invention is to provide a transverse strip guiding member which is disposed intermediate a terminal strip shaping unit and means for bringing together edge portions of a strip into overlapping relation, the transverse strip guiding member being provided with edge portion engaging areas which are spaced apart a distance greater than that normally required by the strip shaping unit and the means for bringing together the edge portions whereby there is a tensioning of the strip edge portions at the point where support for the strip edge portions is found to be necessary.

Yet another object of this invention is to provide a novel terminal transverse strip guiding member which has spaced apart slotted portions for receiving edge portions of a strip in a continuous tube welding apparatus with the slotted portions being spaced apart a distance greater than the normal spacing of the strip edge portions at the location of the guiding member.

With the above, and other objects in view that will hereinafter appear, the nature of the invention will be more clearly understood by reference to the following detailed description, the appended claims and the several views illustrated in the accompanying drawing:

In the drawing:

FIGURE 1 is a schematic perspective view of an apparatus for use in the continuous welding of a tube in accordance with this invention, and shows the specific location on the means for controlling the movement of the edge portions of the strip being formed into a tube immediately prior to the welding together of such edge portions.

FIGURE 2 is an enlarged fragmentary transverse vertical sectional view taken along the line 2—2 of FIGURE 1, and shows the specific cross section of the unseamed tube as it leaves the strip shaping unit.

FIGURE 3 is an enlarged fragmentary transverse vertical sectional view taken along the line 3—3 of FIGURE 1 and shows the specific shape of the terminal transverse strip guiding member and the cross section of the unseamed tube as it passes through the strip guiding member.

FIGURE 4 is an enlarged fragmentary transverse vertical sectional view taken substantially along the line 4—4 of FIGURE 1, and shows the means for supporting the tube at the time contacting edge portions thereof are being forged together, the view schematically showing the edge portions as they would appear immediately before they enter into the forge rolls.

Referring now to the drawing in detail, reference is first made to FIGURE 1 wherein there is illustrated an apparatus for continuously shaping and welding a tube, the apparatus being generally referred to by the numeral 10. In accordance with the invention, a strip 11 is continuously fed through the apparatus 10 from a suitable supply source, such as a coil (not shown) and in the transport of the strip 11 through the apparatus 10, it is first shaped into that of an unseamed tube and then is welded into a continuous tube 12. The apparatus 10 includes a shaping unit, generally referred to by the numeral 13. The shaping unit serves to gradually shape the strip 11 from the planar initial transverse section of the strip to that of a generally tubular form with the edge portions of the strip being relatively widely spaced. The illustrated form of shaping unit 13 includes a suitable supoprt 14 and a plurality of transverse forming members 15 and 16. Although only two forming members 15 and 16 have been illustrated, it is to be understood that for practical purposes, the number would be increased. However, the exact construction of the tube shaping unit 13 is not a part of this invention with the exception of the final shape of the unseamed tube as it passes from the tube shaping unit 13. It is pointed out at this time that the tube shaping unit 13 could be in the form of a continuous guide which is generally funnel shaped, could be in the form of a continuously moving belt which passes through a generally funnel shaped guide, or could be in the form of a plurality of rollers.

Reference is now made to FIGURE 2 wherein it will be seen that when the unseamed tube formed from the strip 11 exits from the tube shaping unit 13, it is of a generally U-shaped configuration and edge portions 17 of the strip are widely spaced and are disposed uppermost. The edge portions 17 are spaced substantially equidistant on opposite sides of a vertical plane through the center of an unseamed tube.

The apparatus 10 is particularly adapted for the formation of a modified form of lap weld and in order to provide for the forming of the welded seam of the tube 12, which seam is referred to by the numeral 18, the edge portions 17 are brought into contacting overlapping relation, as is clearly shown in FIGURE 4. The strip 11 at the time of the forming of the tube 12 is shaped by means of a pair of hourglass rolls 19, as is shown in FIGURE 4. At the same time, the overlapped edge portions 17 pass between an inner forge roll 20 and an outer forge roll 21. The inner forge roll 20 is carried by a horn 22 which extends within the tube 12, both the seamed portion and the unseamed portion thereof, and with the horn 22 being at least partially supported in a cantilever position by a rear horn support 23. The horn 22 is also supported by means of a lower support roll 24 which rides on a lower portion of the tube 12, which lower tube portion, in turn, rides upon a support roll 25.

It will be readily apparent that as the edge portions 17 of the strip pass between the terminal end of the tube shaping unit 13 and the hourglass rolls 19, the edge portions 17 define an elongated shallow V-pattern. As the edge portions 17 approach the apex of the V-pattern, which apex is located slightly in advance of the forge rolls 20 and 21, the edge portions 17 are brought into contact with a pair of electrodes 26 which are connected to a source of radio frequency electrical energy, the electrical energy source being generally referred to by the numeral 27.

In the forming of the welded seam 18, current passes into one of the edge portions 17 through one of the electrodes 26, along the one edge portion to the point of contact between the edge portions 17, and then back along the other edge portion 17 and out through the other electrode 26. The introduction of electrical energy into the edge portions 17 through the electrodes 26 results in the heating of the edge portions 17 immediately in advance of the movement of the edge portions into contacting relation, as is shown in FIGURE 4. The electrical energy will be controlled so that the speed of movement of the edge portions 17, the heating will be such that when the edge portions 17 are brought into contacting relation and passed between the forge rolls 20 and 21, the edge portions will be heated to a forge welding temperature for the particular metal. If a lap joint is desired, the heated edge portions 17 are brought together with only sufficient pressure to effect a forge welding together thereof. On the other hand, if it is desired to eliminate the disadvantages of the raw edges formed in a simple lap weld, the lapped edges are simultaneously forge welded together and forged to a substantially single thickness with the result that the previously double thickness of the lapped metal will flow circumferentially about the tube 12 and the tube 12 will be of a single wall thickness throughout the seam 18.

It will be apparent that when the edge portions 17 are highly heated to a forge welding temperature, the tensile strength of the edge portions is rapidly reduced and at the time the edge portions are brought into contacting relation, since the temperaure is approaching that of molten metal, the edge portions have very little tensile strength and therefore have very little tendency to maintain their previous shapes.

The welded tube passes through a tube towing device, which is generally referred to by the numeral 28. The tube towing device 28 is essentially formed of a pair of endless towing belts 29 which pass around driven drums 30 carried by drive shafts 31. The drive shafts 31 are driven by means of mating gear units 32 from a main drive shaft 33. The belts 29 are also supported by idler drums 34. The opposed runs of the belts 29 are maintained in clamping engagement with the tube 12 by means of combined guiding and clamping blocks 35. The tube towing device 28, not being part of this invention, is not described in further detail here.

It is to be noted that when the tube towing device 28 is in operation, it moves the tube 12 longitudinally with the result that the strip 11 is pulled through the tube shaping unit 13 and through the remainder of the welding apparatus by the driving operation of the tube towing device 28.

The apparatus 10, as described above, has been utilized. However, due to the fact that the V-pattern normally defined by the strip edge portions 17 between the tube shaping unit 13 and the hourglass rolls 19 is extremely shallow and the edge portions 17 are unsupported for a considerable distance, the aforementioned problems of edge guidance have been encountered and tube welding on a continuous basis has not been successful. In accordance with this invention, there is incorporated in the tube welding apparatus a terminal transverse edge portion guiding member which is generally referred to by the numeral 36. Referring now to FIGURE 3 in particular, the edge guiding member 36 will be seen as including a plate 37 which has formed therein a pair of arcuate slots 38 and includes a depending plug portion 39 which is received within the upper portion of the unseamed tube and serves to support the edge portions 17. The free edges of the edge portions 17 are spaced apart by the guiding member 36 a distance which is greater than the normal spacing of the edge portions if the guiding member 36 did not exist. Thus, there is a spreading apart of the edge portions 17 by the guiding member 36 with the result that a new V-pattern, identified by the numeral 40, exists between the guiding member 36 and the hourglass rolls 19. This new V-pattern 40 has a larger angle of convergence than the normal V-pattern without the guiding member 36 so that there is a much shorter space within which the unseamed tube can possibly twist out of its normal longitudinal alignment. Further, since there is a spreading apart of the edge portions 17 from their normal locations, as defined by the terminal end of the tube shaping unit 13 and the hourglass rolls 19, there is a tensioning of the edge portions 17 and the increase of supporting thereof between the electrodes 26 and the hourglass rolls 19.

The net result of the effect of the guiding member 36 on the edge portions 17 is to prevent rotation of the edge portions 17 and to increase the supporting thereof, thus overcoming the previously outlined two major difficulties encountered in perfecting the welding technique. By preventing the rotation of the edge portions 17, the edge portions are brought into the desired contacting relation with respect to the forge rolls 20 and 21, and also, shorting across of the eletcrodes is prevented. In addition, by providing for an increase in support of the edge portions, as the tensile strength of the edge portions decreases due to an increase in the temperature thereof through the heating of the edge portions to a forge welding temperature, sagging or folding of the heated edge portions is prevented and the accumulation of excess metal is eliminated.

Although only a preferred embodiment of the invention has been specifically illustrated and described herein, it is to be understood that minor variations may be made in the invention within the spirit and scope thereof, as defined in the appended claims.

We claim:

1. In a method for welding together the edge portions of strip into a seam in which the edge portions are guided in a V-pattern from separated, non-overlapping first positions to contacting and overlapping relation substantially at the weld point and the edge portions are heated prior to being brought into overlapping relation, the improvement which comprises, at a point within the V-pattern and intermediate said first positions and the weld point, holding the edge portions in a more widely spaced relation than that normally demanded by the V-pattern with the edge portions being placed in tension.

2. In a method for welding together the edge portions of a strip into a seamed tube in which the edge portions of the strip are guided in a V-pattern from separated, non-overlapping first positions to contacting and overlapping relation substantially at the weld point and the edge portions are heated prior to being brought into overlapping relation, the improvement which comprises, at a point within the V-pattern and intermediate said first positions and the weld point, holding the edge portions in a more widely spaced relation than that normally demanded by the V-pattern with the edge portions being placed in tension.

3. In a tube forming and welding apparatus, first guide means for shaping a moving strip into generally tubular form and with the edges of the strip in spaced, non-overlapping relation; second guide means spaced from said first guide means in the direction of strip movement and for bringing edge portions of the strip into contacting and overlapping relation, the normal combined effect of said first and second guide means being to arrange edges of the strip in a narrow V-pattern between said first and second guide means, heating means positioned intermediate said first and second guide means for heating opposite edge portions of the strip to a welding temperature prior to the movement of the opposite edge portions into overlapping relation, the improvement being in the form of third guide means positioned intermediate said first and second guide means for engaging and guiding edge portions of the strip passing between said first and second guide means and spacing apart the strip edge portions a greater distance than that which would occur by the combined guiding influence of said first and second guide means to effect a tensioning of the strip edge portions between said heating means and said second guide means.

4. The apparatus of claim 3 wherein said third guide means is in the form of a member extending transversely of the path of the strip and has a pair of arcuate slits therethrough for receiving strip edge portions.

References Cited

UNITED STATES PATENTS 1,994,111   3/1935   Rocchi _____ 219—66
3,075,484   1/1963   Benteler _____ 113—33

FOREIGN PATENTS 637,036   2/1962   Canada.

RICHARD M. WOOD, *Primary Examiner.*

B. A. STEIN, *Assistant Examiner.*

U.S. Cl. X.R.

113—33